United States Patent [19]

Plumly

[11] 4,385,343

[45] May 24, 1983

[54] EDGE LIGHTED DEVICES

[76] Inventor: George W. Plumly, 1601 Dakar Rd. West, Fort Worth, Tex. 76116

[21] Appl. No.: 95,651

[22] Filed: Nov. 30, 1979

Related U.S. Application Data

[63] Continuation-in-part of Ser. No. 973,246, Dec. 26, 1978.

[51] Int. Cl.³ .............................................. F21V 7/04
[52] U.S. Cl. ...................................... 362/31; 362/32; 362/223; 362/224; 362/235; 362/249; 362/311
[58] Field of Search ................ 362/31, 235, 249, 812, 362/311, 32, 223, 224

[56] References Cited

U.S. PATENT DOCUMENTS

4,059,916  11/1977  Tachihara et al. ............... 362/31 X

*Primary Examiner*—Stephen J. Lechert, Jr.
*Attorney, Agent, or Firm*—Wm. T. Wofford; James C. Fails; Arthur F. Zobal

[57] ABSTRACT

Improved edge lighted devices incorporate one or more light transmitting body assemblies of unique design, resulting in superior performance from both brightness and energy efficiency standpoints. Techniques for obtaining advantageous light transmitting body surface treatment are disclosed. Also disclosed are arrangements for reducing the amount of material utilized for the light transmitting body.

18 Claims, 17 Drawing Figures

EDGE LIGHTED DEVICES

This application is a continuation in part of a copending application, Ser. No. 973,246 filed by George W. Plumly on Dec. 26, 1978 entitled "Improved Edge Lighted Devices".

FIELD OF THE INVENTION

The present invention relates to improved edge lighted devices.

DESCRIPTION OF THE PRIOR ART

In the prior art of which I am aware there are numerous examples of edge lighted devices for various uses, primarily indicia displays. The prior art is well exemplified by U.S. Pat. Nos. 1,146,361; 2,082,724; 2,095,558; 2,157,772; 2,207,117; 2,247,969; 2,297,851; 2,347,665; 2,518,726; 2,646,637; 3,040,168; 3,349,511; 3,752,974; and 3,780,463.

The edge lighted devices of the prior art of which I am aware are deficient in several respects. They have a low efficiency from the standpoint of energy expended for a given level of illumination. They are not capable of producing a sufficient level of illumination for general lighting applications. They are not capable of producing adequate light for emergency lighting applications, from either the energy efficiency or the brightness standpoints.

It is accordingly the general object of the invention to provide improved edge lighted devices.

Another object of the invention is to provide edge lighted devices that are improved from the energy efficiency standpoint.

Another object of the invention is to provide edge lighted devices that are capable of producing a sufficient level of illumination for general lighting applications on an energy efficient basis.

Another object of the invention is to provide edge lighted devices that produce adequate lighting for emergency lighting applications from both the energy efficiency and the brightness standpoints.

SUMMARY OF THE INVENTION

Improved edge lighted devices incorporate one or more light transmitting body assemblies of unique design, resulting in superior performance from both brightness and energy efficiency standpoints. Each light transmitting body assembly in accordance with some embodiments of the invention comprises a light transmitting body and backing material. The light transmitting body is made of transparent thermoplastic material having suitable rigidity, hardness and brittleness characteristics. The light transmitting body must have a light egress face surface, a second face surface opposite the light egress face surface, at least one polished light ingress edge surface and at least one light reflecting edge surface. Both the light egress face surface and the second face surface opposite the light egress face surface must be roughened so as to enhance light egress therefrom. The roughening is preferably such that the roughened surfaces have myriad facets randomly disposed. The preferable roughening can be accomplished by utilizing a process involving a "flapper wheel", and it can also be accomplished by utilizing processes involving a "single cutting point". In some embodiments the backing material, which has a flat white surface that acts as a reflector, is disposed in abutting relation to the second face surface opposite the light egress face surface, and in other embodiments the backing material is spaced from said second face surface. A light source means, preferably a fluorescent tube, is disposed in illuminating relation to the light ingress edge surface. When the backing material is spaced from said second face surface, the maximum thickness of the light transmitting body may be within the range of $\frac{1}{8}$ to $\frac{1}{2}$ D, where D is the diameter of the fluorescent tube. Also, when the backing material is spaced from said second face surface, the spacing between the backing material and the light transmitting body adjacent the maximum thickness of the light transmitting body is approximately D less the maximum thickness of said light transmitting body. The objective in every case is to obtain maximum utilization of the light emanating from the light source means, as well as to obtain an optimum distribution of the light over the light egress face surface. The desired distribution of light on the light egress face surface can be attained by selecting an appropriate angular relation between the backing material reflecting surface and said second face surface when they are spaced apart, and by an appropriate tapering of the light transmitting body which is convergent in the direction away from the light ingress edge surface.

DESCRIPTION OF THE PREFERRED EMBODIMENTS

The present invention has primary applications in the field of emergency lighting. In such applications, it is particularly desirable that the lighting devices be energy efficient because they are often continuously energized. At the same time, the lighting devices should be capable of producing sufficient brightness to be effective in emergency situations.

Investigation and testing of the emergency lighting devices available prior to the present invention have shown them to be woefully inadequate in the presence of the dense smoke that is commonly encountered in a fire emergency. In fact, many lives have been lost in fire emergencies because the emergency exit signs could not be seen through the prevailing smoke density. The problem is especially acute in the case of commercial airline crashes, where there is always a strong likelihood of fire accompanied by dense smoke. The problem in the case of airliners is further complicated because of the relatively large number of passengers in a relatively small space; injured passengers; toxicity of the smoke; and the probability of explosions. In such a situation, a quick and orderly evacuation is essential to the saving of passenger lives; and adequate emergency lighting is a prerequisite to quick and orderly evacuation.

In actual tests conducted by the United States Federal Aviation Administration to determine the performance in the presence of dense smoke of emergency lighting devices available from or proposed by various manufacturers, prototype lighting devices embodying the principles of the present invention were proved to be remarkably superior.

Figure 1:
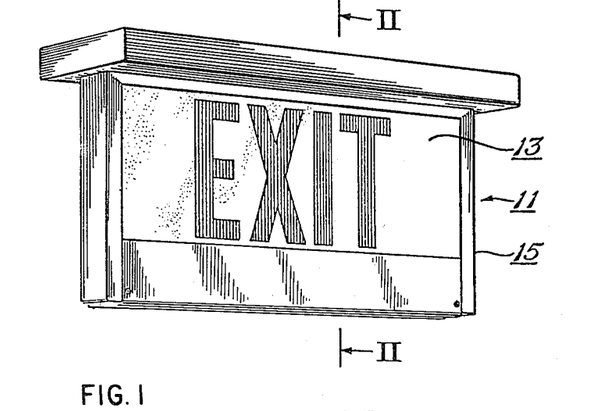
FIG. 1 is a schematic perspective view showing an emergency Exit sign in accordance with a preferred embodiment of the invention.
Figure 2:
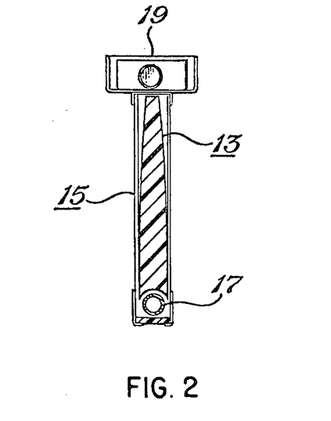
FIG. 2 is a simplified schematic section view taken along lines II—II of FIG. 1.
Figure 3:
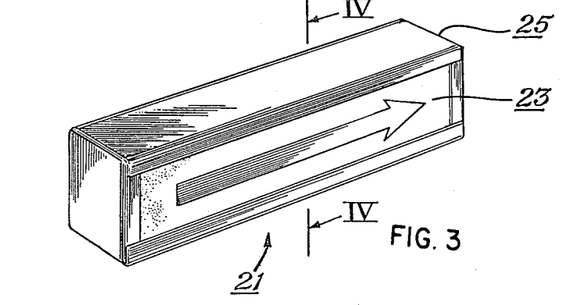
FIG. 3 is a schematic perspective view showing an emergency Exit direction indicating sign in accordance with another embodiment of the invention.
Figure 4:
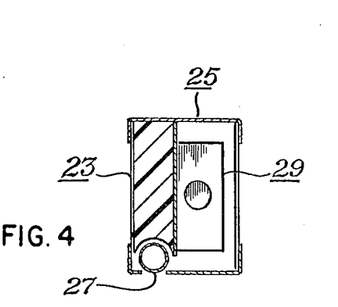
FIG. 4 is a simplified schematic section view taken along lines IV—IV of FIG. 3.
Figures 5, 6, 7, 8, 9:
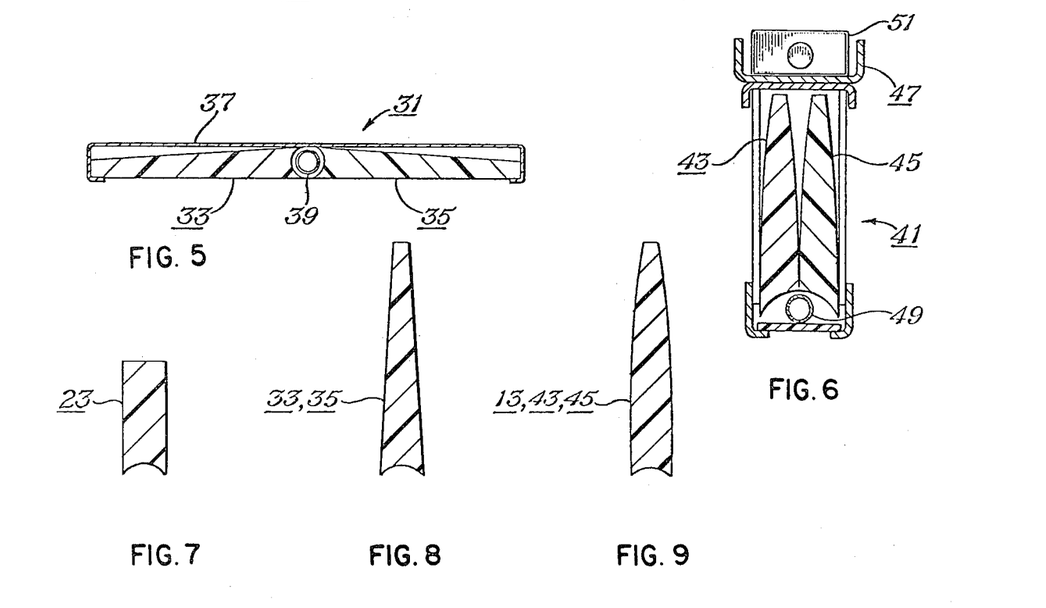
FIG. 5 is a simplified schematic section view showing an edge lighted device in accordance with another embodiment of the invention.
FIG. 6 is a simplified schematic section view showing an edge lighted device in accordance with a further embodiment of the invention.
FIGS. 7, 8 and 9 are simplified schematic section views showing various configurations for the light transmitting body portion of the edge lighted devices of the invention.
Figure 10:
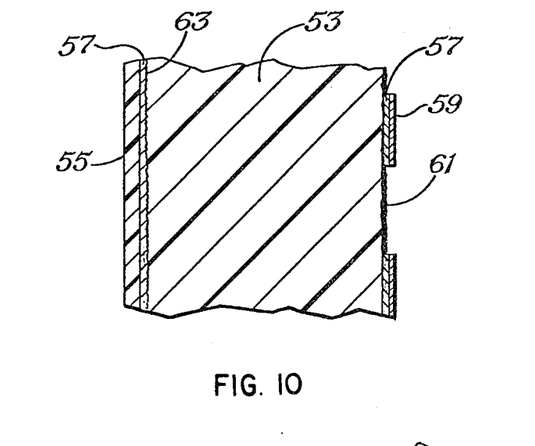
FIG. 10 is an enlarged detail fragmentary section view showing a portion of the light transmitting body and associated parts of FIG. 11.

In FIGS. 1 and 2 of the drawings there is shown an emergency Exit sign 11 embodying the principles of the present invention. The emergency Exit sign 11 comprises a light transmitting body assembly 13, a case assembly 15, light source means 17 and power supply means 19. In FIGS. 3 and 4 of the drawings there is shown an emergency Exit direction indicator sign 21, also embodying the principles of the present invention. The emergency Exit direction indicator sign, like the sign of FIGS. 1 and 2, also comprises a light transmitting body assembly 23, a case assembly 25, light source means 27 and power supply means 29. In FIG. 5 there is shown a lighting device 31 embodying the principles of the present invention and comprising first and second oppositely disposed light transmitting body assemblies 33, 35, a case assembly 37 and light source means 39. This lighting device also comprises a power supply that is not shown. In FIG. 6 there is shown an emergency Exit sign 41 similar to that of FIGS. 1 and 2 except that there are first and second light transmitting body assemblies 43, 45 juxtaposed and facing in opposite directions. This emergency Exit sign also comprises a case assembly 47, light source means 49 and power supply means 51.

It is apparent from the foregoing that elements common to all of the edge lighted devices hereinabove mentioned are one or more light transmitting body assemblies, a case assembly, light source means and power supply means. An important aspect of the present invention resides in the light transmitting body assemblies, which are accordingly herein shown and discussed in some detail. However, the case assemblies, light source means and power supply means are of a more or less conventional nature and consequently, are not shown or discussed in detail herein.

Figure 11:
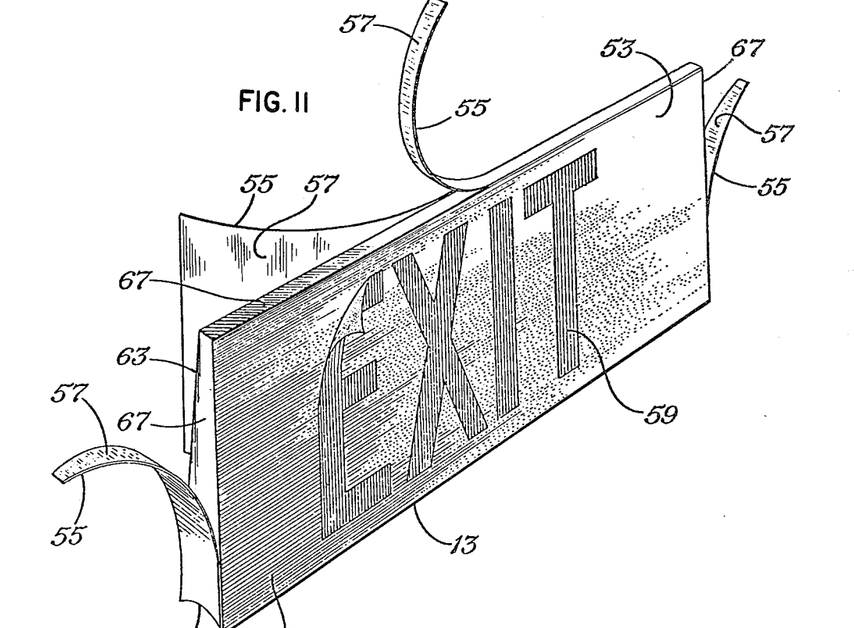
FIG. 11 is a schematic perspective view showing the light transmitting body and associated parts of the device of FIG. 1.

A typical light transmitting body assembly 13 in a preferred form and embodying the principles of the present invention is shown in FIG. 11. The light transmitting body assembly 13 comprises a light transmitting body 53 of clear transparent plastic material, backing material, optically clear adhesive, and indicia.

The light transmitting body must have a light egress face surface, a second face surface opposite the light egress face surface, at least one polished light ingress edge surface and at least one light reflecting edge surface. In the embodiment shown in FIG. 11, the light transmitting body 53 is rectangular and has a light egress face surface 61, a second face surface 63 opposite the light egress face surface, one polished light ingress edge surface 65 and three light reflecting edge surfaces 67.

An important aspect of the invention is that both the light egress face surface and the second face surface opposite the light egress face surface are roughened, preferably in a manner so as to have myriad facets randomly disposed. The term "myriad facets randomly disposed" is used herein to describe a roughened surface that will produce the preferred desired results. It has been found in practice that such a surface can be produced by roughening with a "flapper wheel". Thus it can be said that a preferred roughened surface that is within the definition of the present invention is one that possesses the characteristics obtained by roughening with a "flapper wheel". It has been found that the preferred desired results cannot be obtained by etching or sand blasting.

Figure 12:
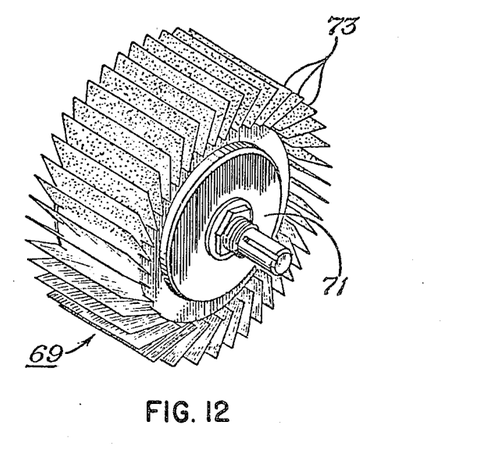
FIG. 12 is a schematic perspective view showing a "flapper wheel".

Flapper wheels are well known devices that are commonly used in machine shops. A typical flapper wheel 69 is schematically shown in FIG. 12 and is basically a rotatable hub 71 on which there are mounted and retained numerous sheets of strips 73 of emery cloth. Flapper wheels are commercially available in various sizes and with various emery cloth grits. It has been found in practice that a roughened surface having the requisite characteristics can be obtained by utilizing a flapper wheel having a diameter of about 3½ inches with the emery cloth sheets or strips having a flap (the distance they extend beyond the hub outer periphery) of about ½ inch and a grit of about 80, and with the rotational speed of the flapper wheel being about 700–800 rpm. While the action of the flapper wheel on the plastic surface is not thoroughly understood, it is thought that particles of plastic are knocked, jerked or torn from the plastic surface so that the remaining surface is quite jagged, thus producing myriad facets randomly disposed. The flapper wheel diameter, flap, grit and rotational speed must be such as to produce the necessary action, and at the same time, care must be taken that the plastic surface is not heated by the friction sufficiently to develop hot spots which would frustrate the desired action and effect. It is preferable that the relative motion between the flapper wheel and the light transmitting body surface being roughened be linear and in a direction parallel to the light ingress edge. It is also preferable that the moving part (either the flapper wheel or the light transmitting body) be mounted on a powered carriage so that the speed of relative motion and the distance between the flapper wheel and the light transmitting body can be made substantially constant.

A preferred roughened surface utilizing a "flapper wheel" may be obtained by the process comprising the steps of:

a. rotating a "flapper wheel" at an appropriate speed;
   b. producing relative linear motion between the "flapper wheel" and the surface being roughened, with the "flapper wheel" rotational axis being substantially parallel to and spaced from said surface being roughened such that peripheral edge portions of the "flapper wheel" strike said surface being roughened.

Another approach to the obtaining of a roughened surface that will produce the preferred desired results ("myriad facets randomly disposed") involves the traverse relative to the light transmitting body of a single cutting point. Although more than one cutting point may be used, only a single cutting point contacts the light transmitting body for each relative traverse.

A preferred embodiment of the single cutting point approach can be described with reference to FIGS. 14 and 15, wherein there is shown a rotating cutter head 81 carrying two single cutting points disposed 180° apart. The cutting head may be attached to the generally vertical spindle of a conventional milling machine (not shown) and thus be adjustable as to vertical position, rotational speed, and tilt.

A light transmitting body 89, a surface of which is to be roughened, is attached to and carried by the milling machine power driven horizontal table so that the light transmitting body can be moved at a selected rate and in a horizontal direction relative to the cutter head 81. The generally vertical spindle 87, and consequently the cutter head 81 is tilted just sufficiently so that a single cutting point 83, 85 will contact the light transmitting body for less than 180° of each cutter head revolution. This tilt of the cutter head 81 assures that a single cutting point 83, 85 will contact the light transmitting body 89 during each cutting pass only, and not at any other time.

Figure 14:
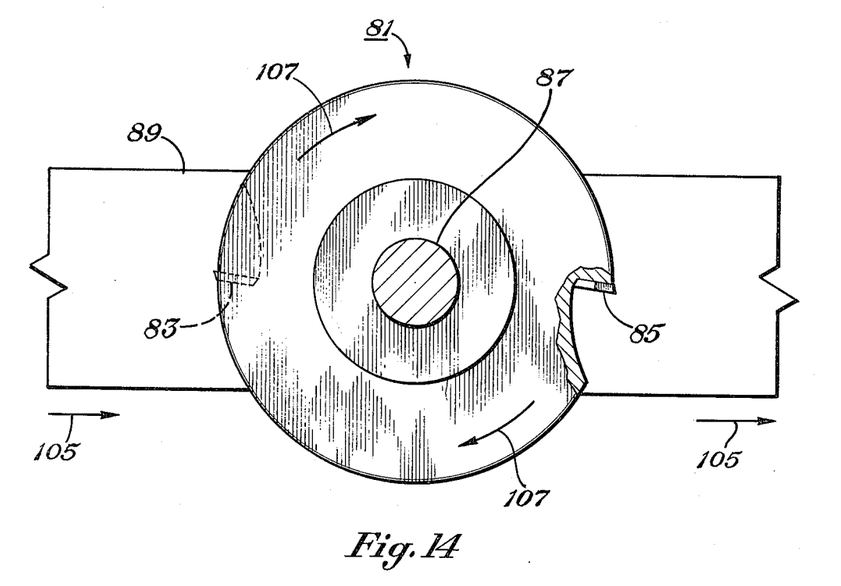
FIG. 14 is a schematic plan view showing a rotating cutter and a light transmitting body.
Figure 15:
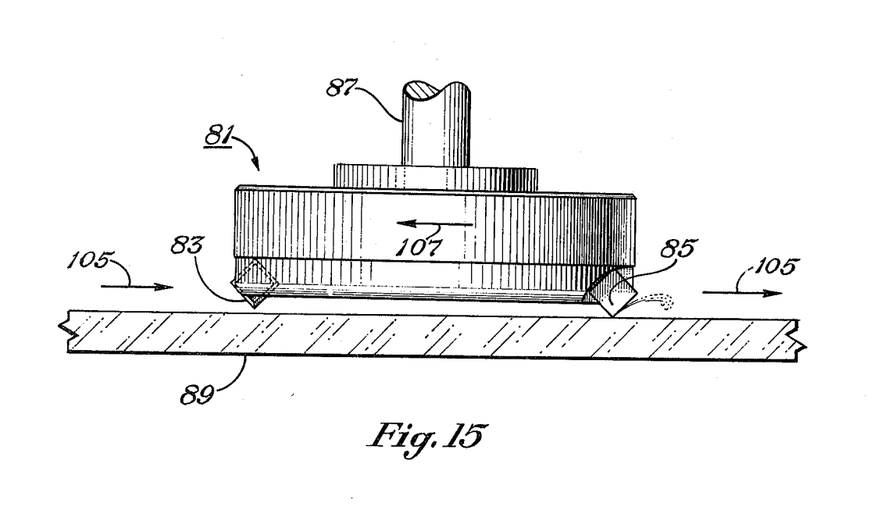
FIG. 15 is a schematic side elevational view of the apparatus of FIG. 14.

In FIGS. 14 and 15 the light transmitting body 89 is being moved in the direction indicated by the arrows 105 while the cutting head is being rotated in the clockwise direction as indicated by the arrows 107. The cutting head 81 is tilted so that the single cutting point 85 is making a cutting pass during which the other single cutting point 83 does not contact the light transmitting body.

In the embodiment shown by FIGS. 14 and 15 it has been found in actual practice that a roughened surface that will produce the preferred desired results will be obtained by using as the material for the light transmitting body 89 a polymethacrylate sheet obtainable from Poly Cast Technology of Stamford, Conn., U.S.A., identified as "Cell Cast" having Rockwell hardness on the M scale in the range M80–M100 and employing values for parameters as follows: (1) the cutter head 81 is rotated at about 2720 R.P.M.; (2) the spindle 87 is tilted slightly past perpendicular and in the direction of feed; (3) each single cutting point 83, 85 is a square carbide cutter $\frac{1}{4}''\times\frac{1}{4}''\times\frac{1}{4}''$ thick with a 1/64" corner radius and a 11 degree positive rake angle; (4) the feed rate for the light transmitting body 89 is about 46.3 inches per minute; (5) the depth of cut (penetration of single cutting point 83, 85 into the light transmitting body) is about 10 thousandths inches.

It may be observed that the spacing of adjacent cuts (and consequently of resulting grooves) is a function of the rotational speed of the cutter head 81, the number of single cutting points 83, 85, and the feed rate for the light transmitting body 89. It may be further observed that an adjacent cut spacing can be chosen that will result in a predetermined overlap of adjacent cuts which will in turn result in a predetermined groove depth. It can be shown that the adjacent cut spacing C in inches is the ratio of the feed rate B in inches per minute and the effective r.p.m. A of the cutter head. It can be further shown that the resulting groove depth E can be expressed in terms of the cutting point corner radius R and the adjacent groove spacing C by the formula:

$$E = R - \sqrt{R^2 - \tfrac{1}{4}C^2}$$

Thus, for the case of the parameter values given above, where B=46.3 inches per minute and A=2×2720=5440 r.p.m. (because there are two single cutting points), C=0.0085 inches. Since R=1/64 inches, E=0.00057 inches.

While what are felt to be optimum results are obtained when the parameter values given for the above example are used, it may be expected that some range of parameter values can be employed while still producing acceptable results.

It has been found that the proper roughening action is not achieved when the depth of cut is excessive. Thus, when it is necessary to remove a considerable amount of the light transmitting body material, such as in the case of the wedge shaped configuration of FIG. 8, a preliminary cut is made to obtain the wedge shape and then a finish cut is made to obtain the desired surface roughening effect. The preliminary cut can be made by any suitable means, including the rotating cutter head of FIGS. 14, 15. It is believed that the maximum acceptable penetration for the finish cut is about 100 thousandths inches and that the minimum acceptable penetration is about 5 thousandths inches.

It has been found that a cutting point corner radius of "sharp" is insufficient to provide acceptable results, while a cutting point corner radius of 1/32 inches is too great to provide acceptable results. Thus the cutting point corner radius should be within the range of greater than sharp to less than 1/32 inches.

It is believed that the groove depth E should be greater than 1/56 and less than 1/14 times the cutting point corner radius, and that adjacent groove spacing should always be such as to provide a cut overlap and result in a groove depth E within the range above-mentioned. The single cutting point velocity can be varied over a range as wide as 50 to 350 inches/second. The actual velocity chosen within the acceptable range will be influenced by factors such as production rates and machine capabilities. The velocity must be kept below that which would generate sufficient heat to cause any tendancy for the light transmitting body material to soften or melt. In the example given above, with a cutter head rotational speed of about 2720 r.p.m. and with the single cutting point rotating on about a 2 inch radius, the single cutting point velocity is about 285 inches/second.

Figure 16:
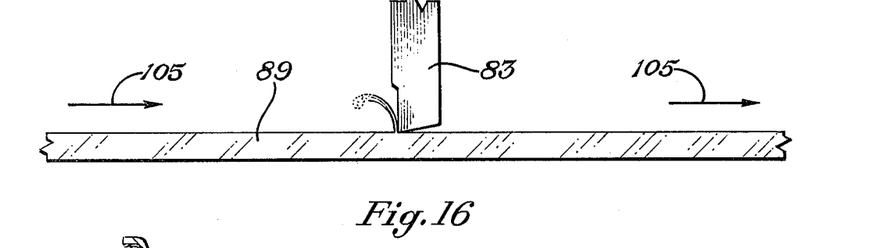
FIG. 16 is a schematic side elevational view showing a linear cutter and a light transmitting body.

Another embodiment of the single cutting point approach is shown by FIG. 16, wherein a single cutting point 83 traverses the light transmitting body 89 along linear paths. The single cutting point 83 may move while the light transmitting body 89 is held stationary. Alternatively, the cutting point could be held stationary while the light transmitting body is moved. The relative movement for cutting action in either case is in the direction of the arrows 105. The ranges of parameter values above-mentioned and the general considerations discussed with regard to the embodiment of FIGS. 14, 15 apply also to the embodiment of FIG. 16.

A preferred roughened surface utilizing a single cutting point may be obtained by the process comprising the steps of:

a. traversing a single cutting point relative to the surface being roughened with the cutting point radius being within the range of greater than "sharp" and less than 1/32 inches; with the maximum penetration of the cutting point into the surface being roughened being within the range of 5 thousandths to 100 thousandths inches; with a predetermined overlap of adjacent cuts that will result in a groove depth within the range of 1/56 to 1/14 times the cutting point radius. A preferred roughened surface utilizing a rotating single cutting point may be obtained by the process comprising the steps of:

a. rotating a single cutting point relative to the surface being roughened so that the cutting point contacts the surface being roughened during less than 180° of each single cutting point revolution; with the cutting point radius being within the range of greater than "sharp" and less than 1/32 inches; with the maximum penetration of the cutting point into the surface being roughened being within the range of 5 thousandths to 100 thousandths inches; with a predetermined overlap of adjacent cuts that will result in a groove depth within the range of 1/56 to 1/14 times the cutting point radius. A preferred roughened surface utilizing a rotating single cutting point may also be obtained by the process comprising the steps of:

a. rotating a single cutting point relative to the surface being roughened so that the cutting point contacts the surface being roughened during less than 180° of each single cutting point revolution; with the cutting point radius being within the range of 1/128 to 3/128 inches; with the maximum penetration of the cutting point into the surface being roughened being within the range of 5 thousandths to 50 thousandths inches; with a predetermined overlap of adjacent cuts that will result in a groove depth within the range of 3/112 to 6/112 times the cutting point radius. The type of materials that may be used in making the light transmitting bodies are the transparent thermoplastic materials having satisfactory rigidity, hardness and brittleness characteristics to enable the attainment of roughened surfaces that will produce the preferred desired results. These types of materials include but are not limited to the various methyl acrylate plastics, polymethylmethacrylate plastics, and polycarbonate plastics. These materials are commonly available under the tradenames Plexiglass, Lucite, and Lexan.

In the embodiments shown, the light egress face surface and second face surface all have rectangular perimeters. It should be apparent that various other perimeter shapes could be used. In fact, the light reflecting edge surface or surfaces could have one perimeter shape and the light ingress edge surface or surfaces could have another perimeter shape; or both could have the same perimeter shape but be concentric, as for example, concentric circles with the light ingress edge surface being the inner one.

The light egress face surface and the second face surface of the light transmitting body opposite the light egress face surface may be planar and parallel, as shown by FIG. 7; or they may be planar and convergent in the direction away from the light ingress edge surface, as shown by FIG. 8; or they may be convex and convergent in the direction away from the light ingress edge surface, as shown by FIG. 9. In applications where the distance from the light ingress edge surface to the opposite polished edge surface is relatively small, as for the case of the emergency Exit direction indicator sign of FIG. 3, the configuration of FIG. 7 is adequate. When such distance is relatively great, as in the case of the emergency Exit sign of FIG. 1, the configuration of FIG. 9 is preferable. For intermediate such distances, the configuration of FIG. 8 may be satisfactory. The combination of the convergent and convex configuration, as shown by FIG. 9, when parameters are properly chosen, give optimum light distribution and brightness over the light egress face surface. These techniques are well known and need not be discussed in detail herein.

In the embodiments of FIGS. 1–11 the maximum thickness of the light transmitting body portion of the light transmitting body assembly 13, etc. is at least as great as the diameter of the light source means 17, etc. (which are shown as fluorescent tubes). Because of the relatively high cost of the clear transparent plastic material from which the light transmitting bodies are made, it is desirable in some cases to minimize the requisite quantity of such material. It has been found that it is possible to substantially reduce the amount of material required for a light transmitting body by utilizing a modified structure. In accordance with the modified structure, the maximum thickness of the light transmitting body portion of a light transmitting body assembly is made to be much less than the diameter of the light source means, and the backing material is spaced apart from the second face surface.

Figure 17:
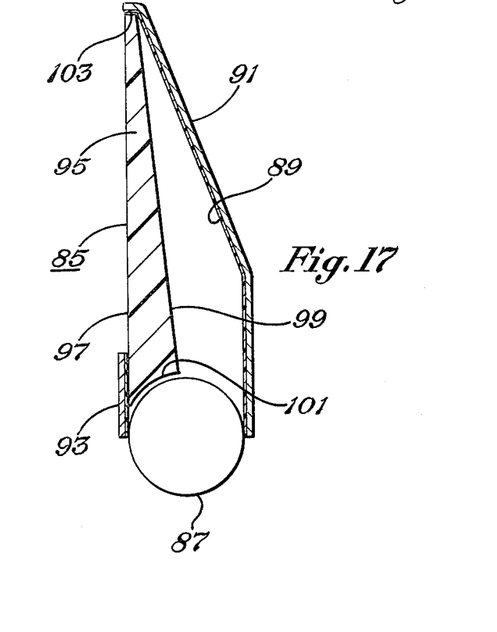
FIG. 17 is a simplified schematic section view showing modified structure for an edge lighted device.

An arrangement exemplifying the modified structure is shown by FIG. 17, wherein there is shown a light transmitting body assembly 85, light source means 87, backing material 89 spaced apart from the light transmitting body assembly, backing material support means 91, and light masking means 93. The light transmitting body assembly 85 is made up of a light transmitting body 95 having a light egress face surface 97, a second face surface 99 opposite the light egress face surface, a polished light ingress edge surface 101, and a light reflecting edge surface 103. The light egress face surface 97 and the second face surface 99 are roughened so as to have myriad facets randomly disposed. In general, the light transmitting body assembly 85 may be in all respects similar to those of other embodiments herein described except that the light transmitting body 95 will have a substantially reduced maximum thickness and the backing material 89 is spaced apart from the second face surface 99.

In FIG. 17 only a single light transmitting body assembly 85 is shown, whereas in actual practice, for general lighting applications, there will normally be a plurality of light transmitting body assemblies 85 associated with each light source means 87.

A light masking means 93 is always employed so that direct rays from the light source means 87 are not radiated and so that the area of the light egress face surface 97 near the light source means is masked.

The actual maximum thickness of the light transmitting body 97 will be related to the diameter of the light source means 87. The minimum maximum thickness from a practical standpoint is about ⅛ D, where D is the diameter of the light source means 87. A maximum thickness found in actual practice to produce good results is about ½ D. The width of the light egress face surface 97 can vary from a minimum of about 1½ D to a maximum of about 20 D.

The objective in every case is to obtain maximum utilization of the light emanating from the light source means 87, as well as to obtain an optimum distribution of the light over the light egress face surface 97.

Excellent utilization of the light emanating from the light source means 87 is attained with the modified structure exemplified by FIG. 17 because there are provided several possible paths by which light rays emanating from the light source means 87 will reach the light egress face surface 97 and be radiated therefrom. A first ray path is from source means 87 into body 95 via ingress edge surface 101 where it is internally reflected until it is refracted at the egress face surface 97 and exits therefrom. A second ray path is from source means 87 into body 95 via ingress edge surface 101 where it is internally reflected until it is refracted at the second face surface 99 and exits therefrom to be further reflected from the backing material 89 and the second face surface 99 until refracted at the second face surface 99 to again enter the body 95 and again be reflected until refracted at the egress face surface 97 to exit therefrom. A third ray path is from the source means 87 through air and reflected by the backing material 89 at an angle that will refract on the second face surface 99 an reflect within the body 95 until again refracted at either the egress face surface 97 or the second face surface 99. A fourth ray path is from the source means 87 through air and reflected by the backing material 89 at an angle that will refract on the second face surface 99 and also on the egress face surface 97 and exit therefrom. A fifth ray path is from the source means 87 through air and reflected by the backing material 89 and the second face surface 99 until refracted at the second face surface 99.

The backing material 89 assumes the contour of the backing material support means 91. The design shape of the support means 91 and hence the backing material 89 will depend upon the diameter D of the light source means 87, the maximum thickness of the light transmitting body 95 in relation to the diameter D, and the desired width of the light egress face surface 97. The desired distribution of light on the light egress face surface 97 can be attained by selecting the angular relation between the backing material 89 and the second face surface 99. In the arrangement of FIG. 17 the surface of the backing material 89 diverges slightly for a first distance outwardly from the light source means 87 and then converges for the remaining distance. The divergence causes some light that would otherwise have been delivered to the light egress face surface 97 in the region closer to the light source means 87 to be delivered to the light egress face surface 97 in the region further away from the light source means 87. The backing material support means 91 and hence the backing material contour can have any shape that will produce the desired light distribution at the light egress face surface 97. The backing material contour can be made up of two planar surfaces as shown by FIG. 17, or a plurality of planar surfaces, or a continuous curvature. Also, the backing material 89 and support means 91 may be integral. In other words the support structure may have a reflecting surface that functions in the same manner as the backing material. The light egress face surface preferably lies in a plane that is approximately tangent to one side of the fluorescent tube light source means, and the reflecting surface of the backing material nearest the light source means is approximately tangent to the side opposite said one side. Thus, the spacing between the backing material and the light transmitting body adjacent the light transmitting body maximum thickness is approximately the light source means diameter D less the maximum thickness of the light transmitting body.

The backing material 55 in the embodiments of FIGS. 1–11 has a flat, white surface disposed in abutting relation to the second face surface 63 opposite the light egress face surface 61 and preferably also to all light reflecting edge surfaces 67. A surface having the characteristics of FAS CAL 505-S white vinyl marking film would be a flat, white surface within the scope of the present invention. In actual practice, FAS CAL 505-S white vinyl marking film, which is commercially available from the Fasson Division of Avery Products Corporation, 11241 Leo Lane, Dallas, Tex. U.S.A., has proven to be a quite satisfactory backing material.

It is preferable that the backing material be affixed to the adjacent or abutting light transmitting body surface by means of an adhesive, which must be an optically clear adhesive. A suitable such optically clear adhesive is the adhesive which is incorporated on the front surface of the FAS CAL 505-S white vinyl marking film hereinabove mentioned.

The indicia material 59 in preferred embodiments is a colored translucent plastic and is affixed to the light egress face surface by means of an adhesive. Also, the preferred colors of indicia material for emergency lighting devices are red or green.

It should be understood that the foregoing discussion of the light transmitting body assembly 13, shown by FIG. 11, applies as well to all light transmitting assemblies within the scope of the present invention, while keeping in mind that in some embodiments the backing material 55 is spaced from the second face surface 63 of the light transmitting body 53. It should be further understood that all of the items in the drawings to which any of the light transmitting body assembly reference numerals 13, 23, 33, 34, 43, 45, 85 have been applied, are considered to be assemblies, although all parts are not necessarily shown or indicated.

All case assemblies, to which any of the reference numerals 15, 25, 37, 47 have been applied should be considered as providing suitable mounting support and protection for the respective light transmitting body assembly and housing for the power supply means and light source means.

Figure 13:
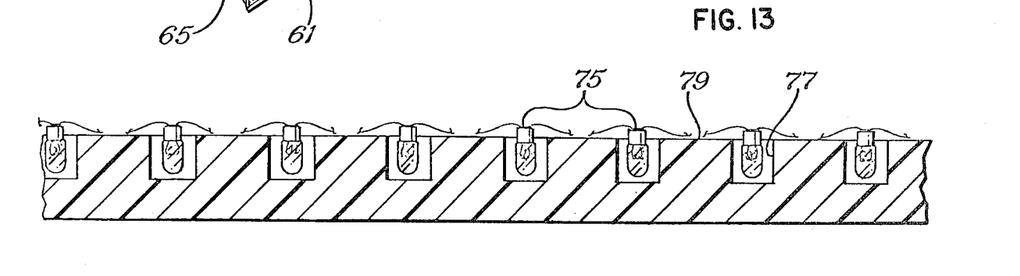
FIG. 13 is an enlarged fragmentary section view showing incandescent light source means associated with a light transmitting body.

The light source means indicated in FIGS. 2, 4, 5, 6 and 17 and to which reference numerals 17, 29, 39, 49 and 87 have been applied, is in each case preferably a single florescent lamp. If desired, a plurality of incandescent lamps could be used. In FIG. 13, there is shown a light source means utilizing a plurality of small incandescent lamps 75 which are disposed in respective cavities 77 in a light transmitting body 79. In some applications it is desirable to utilize low voltage sub-miniature incandescent lamps as the light source means. In other applications, for example, where the light transmitting body edge perimeters are concentric, a single incandescent lamp may be used as the light source means.

The term "power supply means", as used herein, is intended to refer, simply, to the means by which the energy from a power source that is connected to a lighting device is conveyed to the light source means. Thus, the power supply means would include requisite wiring and lamp sockets or recepticles, and in the case of florescent light source means, would further include starter and ballast.

The foregoing disclosure and the showings made in the drawings are merely illustrative of the principles of this invention and are not to be interpreted in a limiting sense.

I claim:

1. An edge lighted device comprising:
   a. a light transmitting body of clear transparent plastic material having a light egress face surface, a second face surface opposite said light egress face surface, at least one light ingress edge surface and at least one light reflecting edge surface;
      i. said light egress face surface and said second face surface each having myriad facets randomly disposed;
      ii. backing material having a flat white surface disposed in abutting relation to said second face surface;
   b. light source means disposed in illuminating relation to said light ingress edge surface.

2. The device of claim 1 wherein said backing material is secured to said second face surface by means of an optically clear adhesive.

3. An edge lighted device comprising:
   a. a light transmitting body of clear transparent plastic material having a light egress face surface, a second face surface opposite said light egress face surface, at least one light ingress edge surface and at least one light reflecting edge surface;
      i. said light egress face surface and said second face surface each having myriad facets randomly disposed;
      ii. backing material having a flat white surface disposed in spaced relation to said second face surface;
   b. light source means disposed in illuminating relation to said light ingress edge surface.

4. The device of claim 3 wherein said light source is a fluorescent tube having diameter D and said light transmitting body has a maximum thickness within the range of $\frac{1}{8}$ to $\frac{1}{2}$ D.

5. The device of claim 4 wherein the spacing between said backing material and said light transmitting body adjacent the light transmitting body maximum thickness is approximately D less the maximum thickness of said light transmitting body.

6. An edge lighted device comprising:
   a. a light transmitting body of clear transparent plastic material having a light egress face surface, a second face surface opposite said light egress face surface, at least one light ingress edge surface and at least one light reflecting edge surface;
      i. said light egress face surface and said second face surface each having myriad facets randomly disposed;
      ii. backing material having a flat white surface disposed to reflect light emanating from said second face surface;
   b. light source means disposed in illuminating relation to said light ingress edge surface.

7. An edge lighted device comprising:
   a. a light transmitting body of clear transparent plastic material having a light egress face surface, a second face surface opposite said light egress face surface, at least one light ingress edge surface and at least one light reflecting edge surface;
      i. said light egress face surface and said second face surface each being roughened so as to enhance light egress therefrom;
      ii. backing material having a flat white surface disposed in abutting relation to said second face surface;
   b. light source means disposed in illuminating relation to said light ingress edge surface.

8. An edge lighted device comprising:
   a. a light transmitting body of clear transparent plastic material having a light egress face surface, a second face surface opposite said light egress face surface, at least one light ingress edge surface and at least one light reflecting edge surface;
      i. said light egress face surface and said second face surface each being roughened so as to enhance light egress therefrom;
      ii. backing material having a flat white surface disposed to reflect light emanating from said second face surface;
   b. light source means disposed in illuminating relation to said light ingress edge surface.

9. An edge lighted device comprising:
   a. a light transmitting body of clear transparent plastic material having a light egress face surface, a second face surface opposite said light egress face surface, at least one light ingress edge surface and at least one light reflecting edge surface;
      i. said light egress face surface and said second face surface each being roughened so as to enhance light egress therefrom;
      ii. backing material having a flat white surface disposed in spaced relation to said second face surface;
   b. light source means disposed in illuminating relation to said light ingress edge surface.

10. The device of claim 9 wherein said light source is a fluorescent tube having diameter D and said light transmitting body has a maximum thickness within the range of $\frac{1}{8}$ to $\frac{1}{2}$ D.

11. The device of claim 10 wherein the spacing between said backing material and said light transmitting body adjacent the light transmitting body maximum thickness is approximately D less the maximum thickness of said light transmitting body.

12. The device of any one of claims 1–6 wherein said light egress face surface and said second surface are each characterized by a surface roughening such as that obtained by roughening with a "flapper wheel".

13. The device of any one of claims 1–6 wherein said light egress face surface and said second face surface have been roughened with a "flapper wheel".

14. The device of any one of claims 1–6 wherein there is translucent indicia disposed in abutting relation to said light egress surface.

15. The device of any one of claims 1–6 wherein said light egress face surface and said second face surface have been roughened by the process comprising the steps of:
   a. rotating a "flapper wheel" at an appropriate speed;
   b. producing relative linear motion between the "flapper wheel" and the surface being roughened, with the "flapper wheel" rotational axis being substantially parallel to and spaced from said surface being roughened such that peripheral edge portions of the "flapper wheel" strike said surface being roughened.

16. The device of any one of claims 1-6 wherein said light egress face surface and said second surface have been roughened by the process comprising the steps of:
   a. traversing a single cutting point relative to the surface being roughened with the cutting point radius being within the range of greater than "sharp" and less than 1/32 inches; with the maximum penetration of the cutting point into the surface being roughened being within the range of 5 thousandths to 100 thousandths inches; with a predetermined overlap of adjacent cuts that will result in a groove depth within the range of 1/56 to 1/14 times the cutting point radius.

17. The device of any one of claims 1-6 wherein said light egress face surface and said second surface have been roughened by the process comprising the steps of:
   a. rotating a single cutting point relative to the surface being roughened so that the cutting point contacts the surface being roughened during less than 180° of each single cutting point revolution; with the cutting point radius being within the range of greater than "sharp" and less than 1/32 inches; with the maximum penetration of the cutting point into the surface being roughened being within the range of 5 thousandths to 100 thousandths inches; with a predetermined overlap of adjacent cuts that will result in a groove depth within the range of 1/56 to 1/14 times the cutting point radius.

18. The device of any one of claims 1-6 wherein said light egress face surface and said second surface have been roughened by the process comprising the steps of:
   1. rotating a single cutting point relative to the surface being roughened so that the cutting point contacts the surface being roughened during less than 180° of each single cutting point revolution; with the cutting point radius being within the range of 1/128 to 3/128 inches; with the maximum penetration of the cutting point into the surface being roughened being within the range of 5 thousandths to 50 thousandths inches; with a predetermined overlap of adjacent cuts that will result in a groove depth within the range of 3/112 to 6/112 times the cutting point radius.

* * * * *